United States Patent
Vasefi et al.

(10) Patent No.: US 11,658,349 B2
(45) Date of Patent: May 23, 2023

(54) LINK DEVICE FOR COUPLING ENERGY STORAGE DEVICES HAVING DISPARATE CHEMISTRIES

(71) Applicant: Goal Zero LLC, Bluffdale, UT (US)

(72) Inventors: Keyvan Vasefi, Payson, UT (US); Robert Kerback, Bluffdale, UT (US); Sterling Robison, Cottonwood Heights, UT (US); Evan Price, Bluffdale, UT (US)

(73) Assignee: GOAL ZERO LLC., Bluffdale, UT (US)

( * ) Notice: Subject to any disclaimer, the term of this patent is extended or adjusted under 35 U.S.C. 154(b) by 103 days.

(21) Appl. No.: 17/320,917

(22) Filed: May 14, 2021

(65) Prior Publication Data

US 2021/0273464 A1 Sep. 2, 2021

Related U.S. Application Data

(63) Continuation of application No. 16/889,044, filed on Jun. 1, 2020, now Pat. No. 11,011,916, which is a
(Continued)

(51) Int. Cl.
*H01M 10/42* (2006.01)
*H01M 10/44* (2006.01)
(Continued)

(52) U.S. Cl.
CPC ....... *H01M 10/425* (2013.01); *H01M 10/441* (2013.01); *H01M 10/46* (2013.01);
(Continued)

(58) Field of Classification Search
CPC .... H02J 7/0003; H02J 7/00032; H02J 7/0013; H02J 7/0032; H01M 10/441; H01M 10/46
(Continued)

(56) References Cited

U.S. PATENT DOCUMENTS

2002/0171397 A1 11/2002 Adrian et al.
2013/0043826 A1 2/2013 Workman et al.
(Continued)

FOREIGN PATENT DOCUMENTS

WO WO-2011/106431 A2 9/2011

*Primary Examiner* — Nathaniel R Pelton
(74) *Attorney, Agent, or Firm* — Maschoff Brennan

(57) ABSTRACT

An energy system includes an energy storage device and a link device. The energy storage device includes a housing and a battery disposed within the housing. The battery has a first chemistry. The link device is configured to facilitate electrically coupling the energy storage device to an external battery having a second chemistry different than the first chemistry, receive input power from the external battery, and regulate a power profile of the input power received from the external battery such that the energy storage device can accept the input power from the external battery. The energy storage device is configured to receive the input power from the external battery having the second chemistry through the link device and provide output power to a load using the input power received from the external battery having the second chemistry.

20 Claims, 9 Drawing Sheets

Related U.S. Application Data continuation of application No. 16/579,718, filed on Sep. 23, 2019, now Pat. No. 10,873,192.

(60) Provisional application No. 62/735,396, filed on Sep. 24, 2018.

(51) Int. Cl.
  *H01M 10/46* (2006.01)
  *H02J 7/00* (2006.01)

(52) U.S. Cl.
  CPC .......... *H02J 7/0013* (2013.01); *H02J 7/0032* (2013.01); *H02J 7/00032* (2020.01); *H02J 7/0042* (2013.01); *H02J 7/0063* (2013.01); *H02J 7/00047* (2020.01)

(58) Field of Classification Search
  USPC ........................................................ 320/104
  See application file for complete search history.

(56) References Cited

U.S. PATENT DOCUMENTS

| | | |
|---|---|---|
| 2013/0116889 A1 | 5/2013 | Zhang et al. |
| 2013/0147272 A1* | 6/2013 | Johnson ................ H02J 3/381 |
| | | 307/29 |
| 2013/0183562 A1* | 7/2013 | Workman ........... H01M 50/502 |
| | | 429/100 |
| 2014/0011057 A1 | 1/2014 | Schaefer |
| 2014/0375276 A1 | 12/2014 | Zeier |
| 2015/0214770 A1* | 7/2015 | Chen ..................... H02J 1/08 |
| | | 320/135 |
| 2016/0185249 A1 | 6/2016 | King et al. |
| 2016/0190801 A1 | 6/2016 | McGrath et al. |
| 2016/0190813 A1 | 6/2016 | Kumar |
| 2017/0070073 A1* | 3/2017 | Mohammed ........... H01G 11/14 |
| 2018/0034015 A1 | 2/2018 | Krantz et al. |
| 2019/0067753 A1 | 2/2019 | Maksimovic et al. |
| 2019/0103805 A1* | 4/2019 | Zhu ..................... H02J 7/02 |
| 2020/0185930 A1* | 6/2020 | Kuwata ................ H01L 23/367 |

* cited by examiner

LINK DEVICE FOR COUPLING ENERGY STORAGE DEVICES HAVING DISPARATE CHEMISTRIES

CROSS-REFERENCE TO RELATED PATENT APPLICATIONS

This application is a continuation of U.S. patent application Ser. No. 16/889,044, filed Jun. 1, 2020, which is a continuation of U.S. patent application Ser. No. 16/579,718, filed Sep. 23, 2019, which claims the benefit of U.S. Provisional Patent Application No. 62/735,396, filed Sep. 24, 2018, all of which are incorporated herein by reference in their entireties.

BACKGROUND

Different energy storage solutions have varying characteristics. Some characteristics lend themselves to long-term energy storage while others lend themselves to short-term energy storage. Traditionally, batteries having disparate battery chemistries are incompatible.

SUMMARY

One embodiment relates to an energy system. The energy system includes an energy storage device and a link device. The energy storage device includes a housing and a battery disposed within the housing. The battery has a first chemistry. The link device is configured to facilitate electrically coupling the energy storage device to an external battery having a second chemistry different than the first chemistry, receive input power from the external battery, and regulate a power profile of the input power received from the external battery such that the energy storage device can accept the input power from the external battery. The energy storage device is configured to receive the input power from the external battery having the second chemistry through the link device and provide output power to a load using the input power received from the external battery having the second chemistry.

Another embodiment relates to an energy system. The energy system includes a housing, a battery disposed within the housing, and a link device. The battery has a first chemistry. The link device is configured to facilitate electrically coupling the battery to an external source having a second chemistry different than the first chemistry, receive an input from the external source, and regulate the input received from the external source such that the battery can accept the input from the external source. The battery is configured to receive the input from the external source having the second chemistry through the link device, store the input as stored energy, and provide an output to a load using the stored energy including the input.

Still another embodiment relates to an energy system. The energy storage system includes an energy storage device and a link device. The energy storage device includes a housing and a battery disposed within the housing. The battery has a first chemistry. The link device has a first interface and a second interface. The first interface is configured to selectively couple to the energy storage device. The second interface is configured to selectively couple to an external battery having a second chemistry different than the first chemistry. The link device is configured to facilitate electrically coupling the energy storage device and the external battery together, receive first power from the external battery and provide the first power to the energy storage device, and receive second power from the energy storage device and provide the second power to the external battery. The energy storage device is configured to receive the first power from the external battery through the link device, provide the second power to the link device to charge the external battery, and at least one of (i) provide third power to a load using the first power directly or (ii) store the first power in the battery as stored energy and provide the third power to the load using the stored energy.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
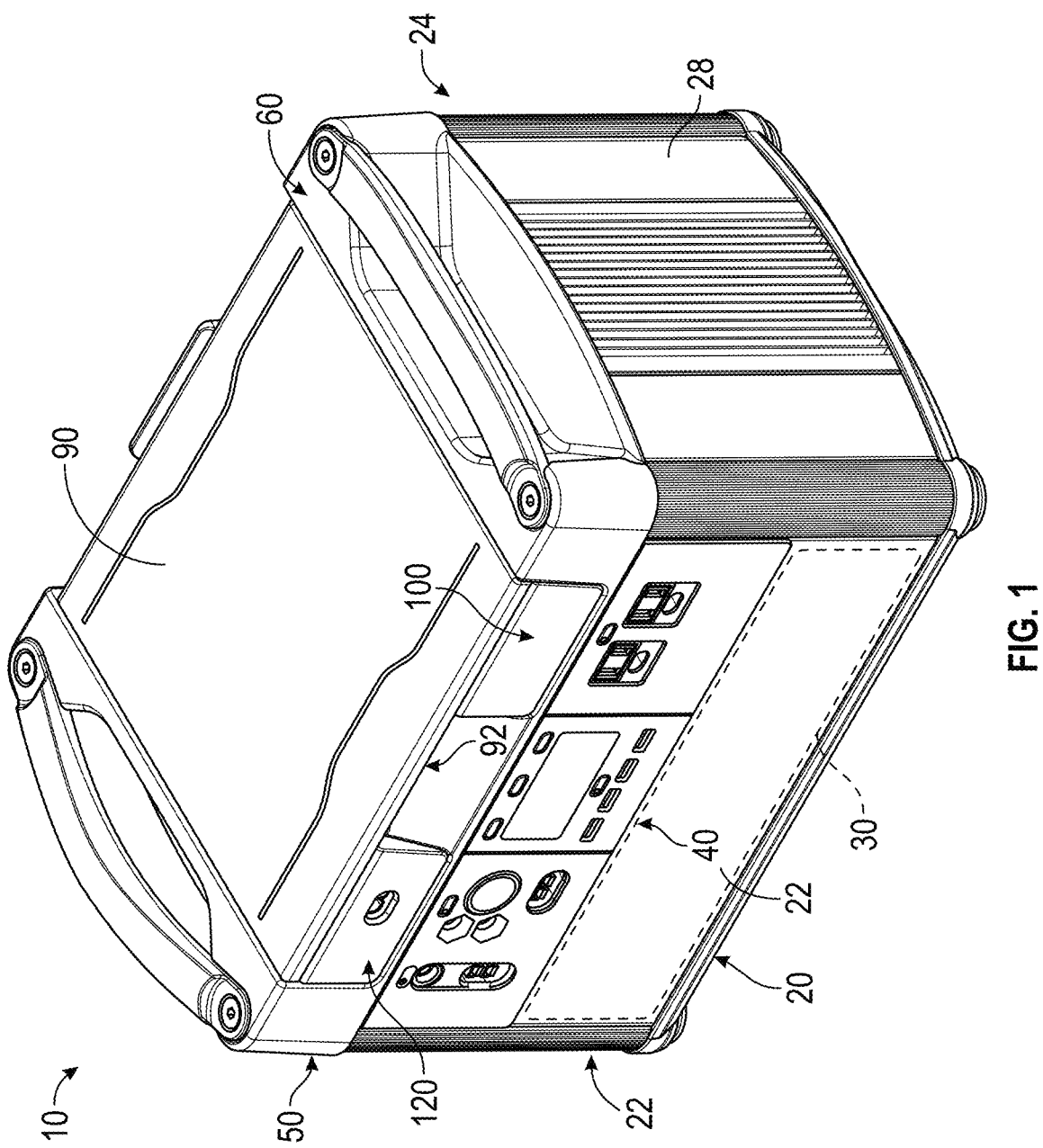
FIG. 1 is a front perspective view of an energy storage and power supply device, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a linking device is configured to facilitate electrically coupling an energy storage and power supply device including an energy storage unit having a first energy storage chemistry (e.g., lithium-ion batteries, lithium iron phosphate batteries, etc.) with an external energy source having a second, different energy storage chemistry (e.g., lead-acid batteries, lithium iron phosphate batteries, a rechargeable fuel cell system, etc.). In some embodiments, the linking device is configured to facilitate electrically coupling a plurality of external energy sources to the energy storage and power supply device. The plurality of external energy sources may each have the same energy storage chemistry (i.e., the second energy storage chemistry) or at least one of the plurality of external energy sources may have third energy storage chemistry.

Such a linking device advantageously facilitates repurposing or retrofitting an energy storage and power supply device that would otherwise not be suitable for various applications including home power backup. By way of example, the energy storage and power supply device may include lithium-ion batteries and/or lithium iron phosphate batteries that are relatively light weight such that the energy storage and power supply device is highly portable. However, to provide suitable battery capacity for a home power backup application may require numerous energy storage and power supply devices, which given the battery chemistries thereof, can be rather expensive. Accordingly, the linking device facilitates linking one or more relatively cheaper and/or heavier external power sources (e.g., lead acid batteries, a rechargeable fuel cell, etc.) to the energy storage and power supply device to provide the extra power capacity needed to adequately provide for home power backup. The linking device therefore facilitates selectively coupling and decoupling the energy storage and power supply device to/from the one or more relatively cheaper and/or heavier external power sources when desired (e.g., to facilitate taking the energy storage and power supply device camping, tailgating, etc.), while the cheaper and/or heavier external power sources can remain in the designated location (e.g., in a basement of a residence where the connection to the power grid of the residence is located, etc.).

According to the exemplary embodiment shown in FIGS. 1-5, an energy storage and power supply device (e.g., a solar generator, a hybrid combustion and solar generator, etc.), shown as energy storage and power supply device 10, is configured to receive and store electrical power from a power source for future use (e.g., in a remote location where electricity is not readily available, during a power outage to power a residence, etc.). The power source may include a solar panel system, a combustion generator (e.g., a gasoline-fueled generator, etc.), a power supply (e.g., a 120 Volt ("V") AC wall charger, a 220V AC wall charger, a 240V AC wall charger, etc.), a 12V car adapter, and/or an external energy storage source (e.g., an energy tank, etc.). The stored electrical power may be provided to a load device (e.g., a smartphone, a tablet, an E-reader, a computer, a laptop, a smartwatch, a portable and rechargeable battery pack, appliances, a refrigerator, lights, display monitors, televisions, an electrical grid of a residence or building, etc.) to at least one of charge and power the load device.

Figure 2:
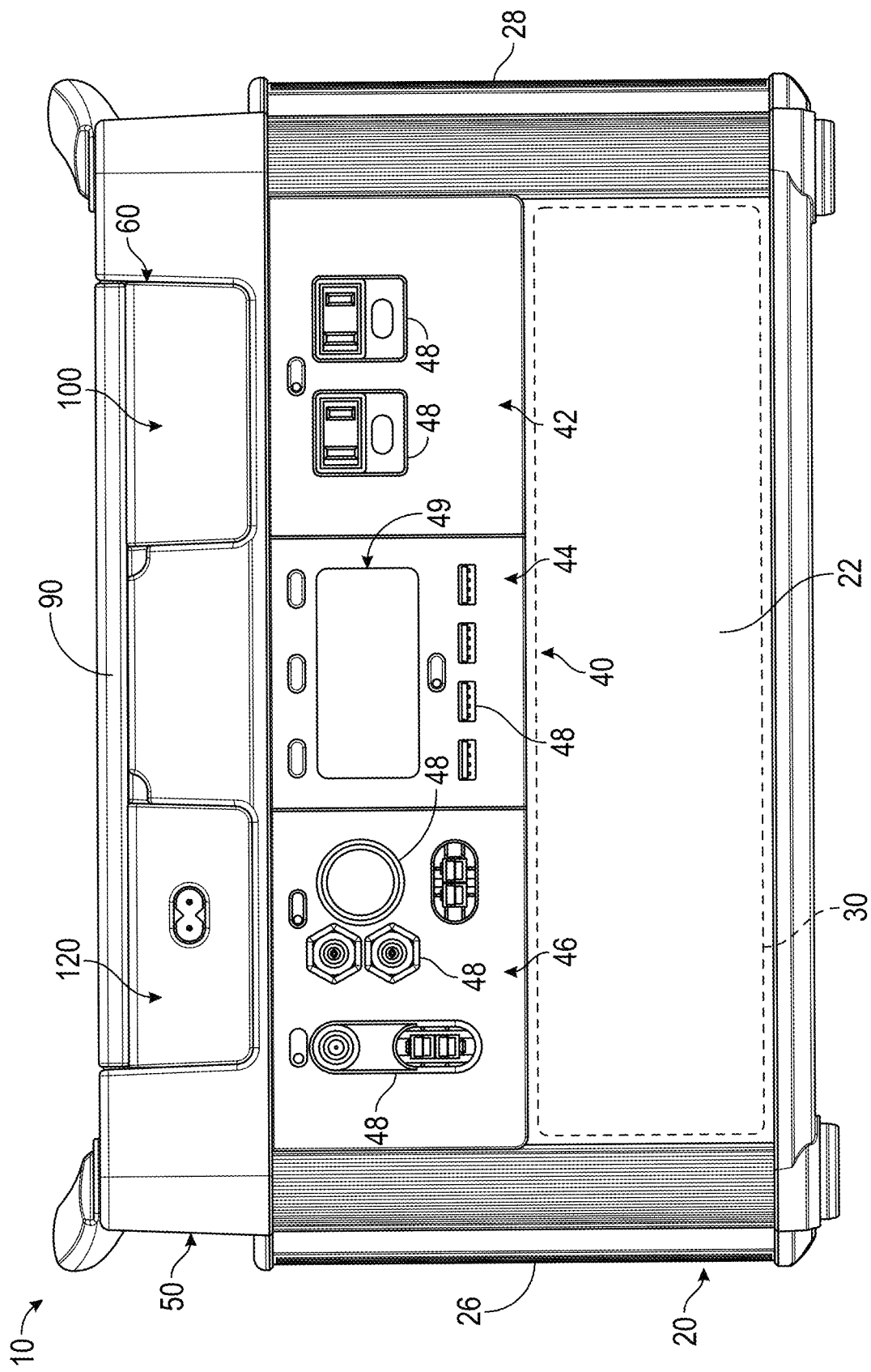
FIG. 2 is a front view of the energy storage and power supply device of FIG. 1, according to an exemplary embodiment.

As shown in FIGS. 1-4, the energy storage and power supply device 10 includes a housing, shown as housing 20, and a body, shown as top 50. In one embodiment, the top 50 is integrally formed with the housing 20 (e.g., a unitary structure, extends therefrom, etc.). In another embodiment, the top 50 is detachably coupled to the housing 20 (e.g., with fasteners, etc.). As shown in FIGS. 1 and 2, the housing 20 includes a first face, shown as front wall 22, an opposing second face, shown as rear wall 24, a first sidewall, shown as right sidewall 26, and an opposing second sidewall, shown as left sidewall 28. As shown in FIGS. 1 and 2, the energy storage and power supply device 10 includes an energy storage unit, shown as battery 30. According to an exemplary embodiment, the front wall 22, the rear wall 24, the right sidewall 26, and the left sidewall 28 cooperatively define an internal cavity of the energy storage and power supply device 10 that receives the battery 30. The battery 30 may include one or more lithium-ion cells. According to an exemplary embodiment, the battery 30 includes a 10.8$V_{nominal}$ lithium-ion battery. In some embodiments, the battery 30 includes a plurality of batteries (e.g., two or more batteries connected in series, etc.). In some embodiments, the battery 30 additionally or alternatively includes another type of battery (e.g., a lead-acid battery, a lithium iron phosphate battery, etc.) or another energy storage unit (e.g., one or more capacitors, a rechargeable fuel cell, etc.). In some embodiments, the battery 30 is configured to operate at different voltages (e.g., 24$V_{nominal}$, 36$V_{nominal}$, 48$V_{nominal}$, etc.) to improve the efficiency of circuitry and wiring.

As shown in FIGS. 1-4, the energy storage and power supply device 10 includes an interface, shown as user interface 40, disposed along the front wall 22. In other embodiments, at least a portion of the user interface 40 is disposed on and/or along the rear wall 24, the right sidewall 26, the left sidewall 28, and/or the top 50. As shown in FIG. 2, the user interface 40 includes a first portion, shown as first panel 42, a second portion, shown as second panel 44, and a third portion, shown as third panel 46. As shown in FIG. 2, the first panel 42 includes a first plurality of interfaces, the second panel 44 includes a second plurality of interfaces, and the third panel 46 includes a third plurality of interfaces, shown as input/output ("I/O") ports 48. The I/O ports 48 are electrically coupled to the battery 30, according to an exemplary embodiment. According to an exemplary embodiment, (i) at least a portion of the I/O ports 48 are configured to receive electrical energy from a power source (e.g., a solar panel system, a combustion generator, a power supply, a 12V car adapter, etc.) for storage by the battery 30, (ii) at least a portion of the I/O ports 48 are configured to provide the stored electrical energy within the battery 30 to a load device (e.g., a smartphone, a tablet, an E-reader, a computer, a laptop, a smartwatch, a portable and rechargeable battery pack, appliances, a refrigerator, lights, display monitors, televisions, a power grid of a residence or building, etc.) with a power and/or charging cable connected therebetween, and/or (iii) at least a portion of the I/O ports 48 are configured to receive and provide electrical energy (i.e, operate as dual functioning ports).

According to the exemplary embodiment shown in FIG. 2, the I/O ports 48 of the first panel 42, the second panel 44, and the third panel 46 include alternating current ("AC") inverter ports (e.g., having a 110V outlet port, etc.), direct current ("DC") inputs and/or outputs, USB ports, a 6 millimeter ("mm") port, a 12V car port, a 12V powerpole port (e.g., an Anderson Powerpole, etc.), a charging port (e.g., a solar panel charging port, a combustion generator charging port, a power supply charging port, a powerpole charging port, etc.), and/or a chaining port (e.g., to electrically couple two or more of the energy storage and power supply devices 10 in series, a powerpole chaining port, etc.). In some embodiments, the I/O ports 48 include a linking port (e.g., similar to the linking carriage of the present disclosure, etc.) configured to facilitate selectively coupling one or more external power sources to the energy storage and power supply device 10 that have a disparate energy storage chemistry relative to the battery 30 of the energy storage and power supply device 10. As shown in FIG. 2, the second panel 44 includes a display, shown as display 49. The display 49 may provide various information regarding the state and/or operation of the energy storage and power supply device 10 and/or the battery 30 (e.g., a battery level, a current input power, a current input voltage, a current input current, a current output power, a current output voltage, a current output current, an estimated time until a full charge of the battery 30 is reached, an estimated time until full and/or permitted depletion of the battery 30 is reached, a battery temperature, an insignia, a notification, a warning, etc.).

Figure 3:
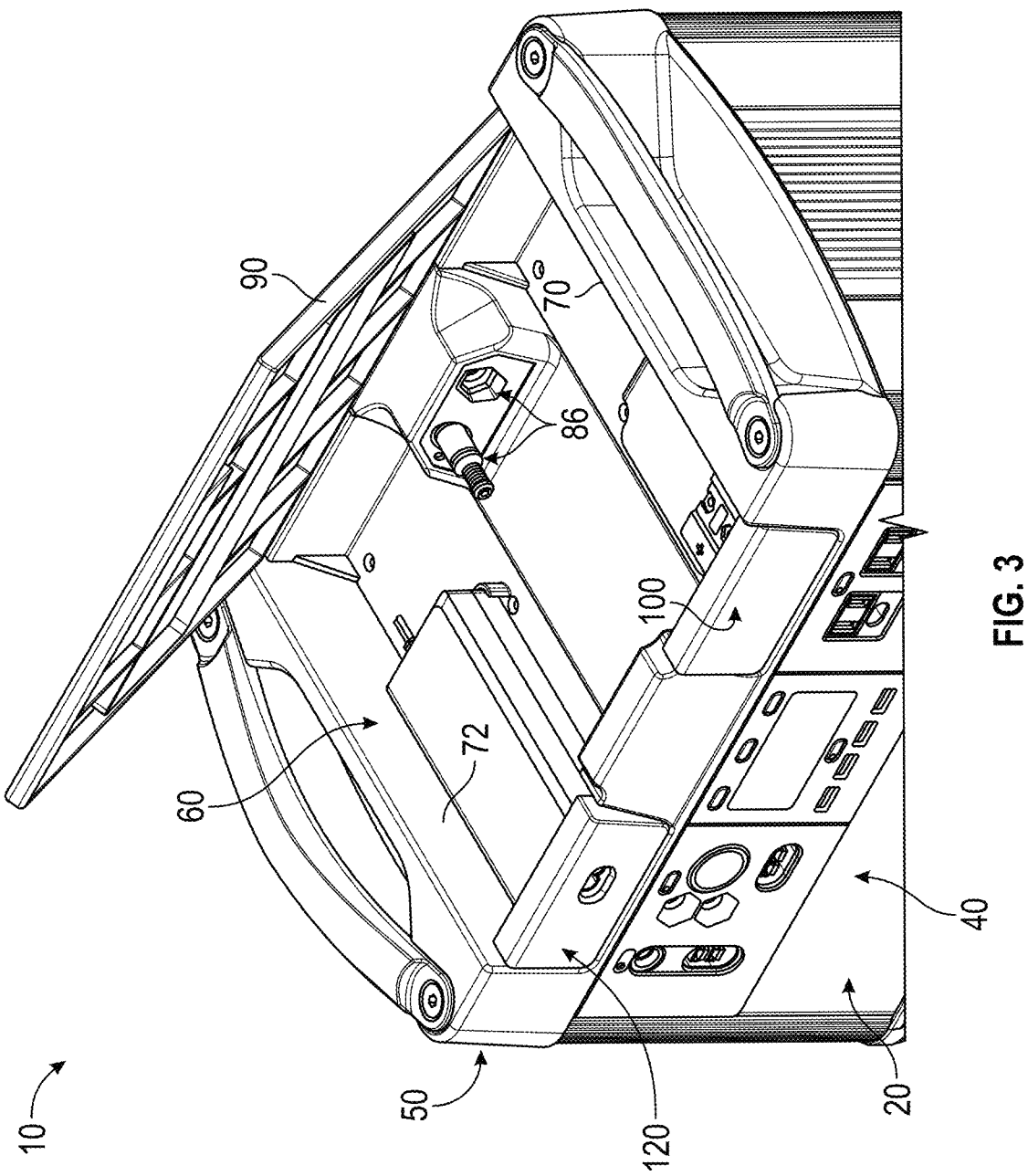
FIG. 3 is a perspective view of the energy storage and power supply device of FIG. 1 with a lid thereof selectively reconfigured in an open orientation, according to an exemplary embodiment.

As shown in FIGS. 1-3, the top 50 defines a recess, shown as cavity 60. The energy storage and power supply device 10 includes a cover, shown as lid 90. The lid 90 is positioned to facilitate selectively accessing and enclosing the cavity 60, according to an exemplary embodiment. An operator of the energy storage and power supply device 10 may thereby engage a front portion, shown as front lip 92, of the lid 90 to selectively reposition the lid 90 between a first orientation (e.g., a closed orientation shown in FIGS. 1 and 2, etc.) and a second orientation (e.g., an open orientation shown in FIGS. 3 and 4, etc.) to selectively access the cavity 60.

Figure 4:
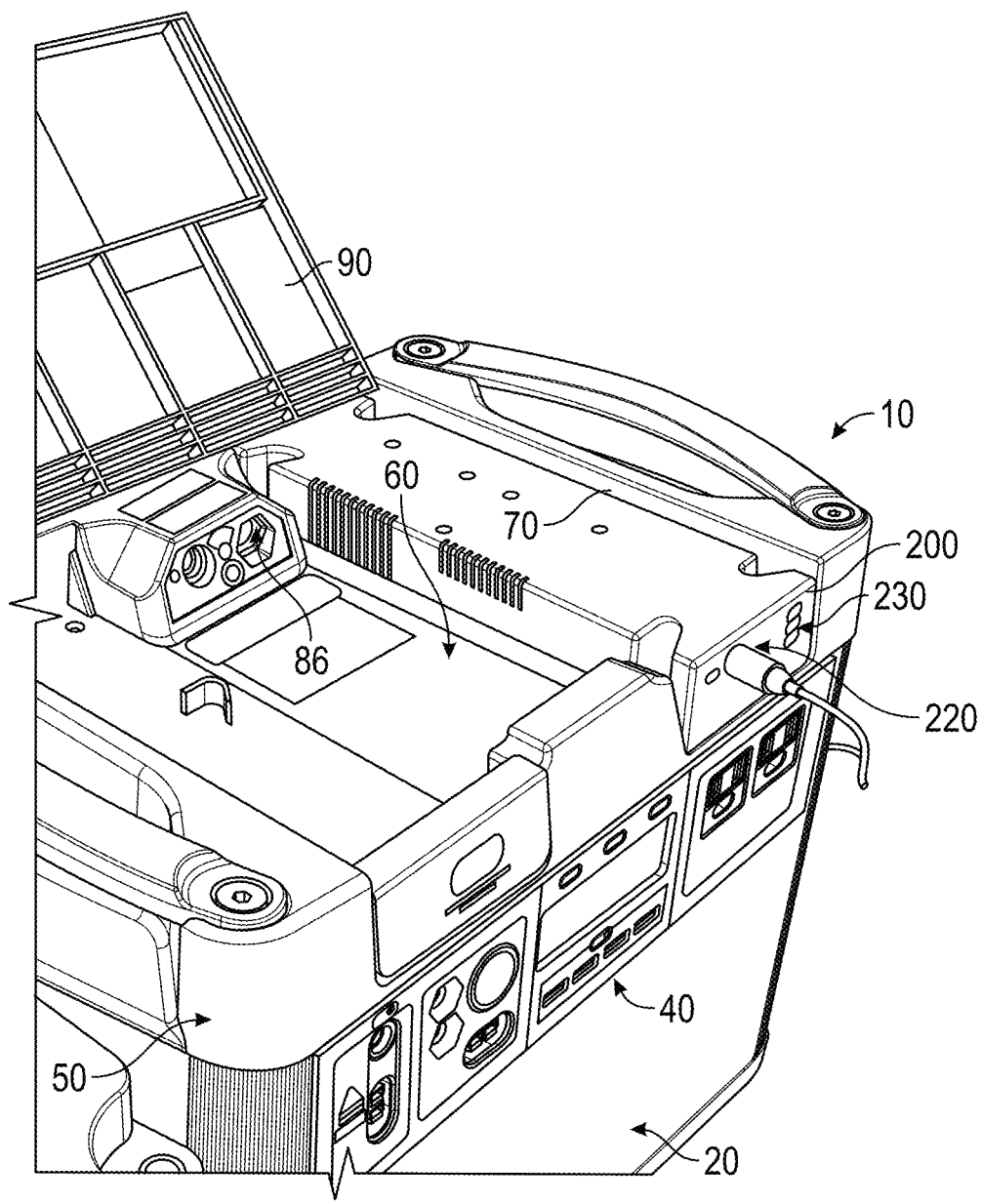
FIG. 4 is a perspective view of the energy storage and power supply device of FIG. 3 having a linking module coupled thereto, according to an exemplary embodiment.

As shown in FIGS. 3 and 4, the cavity 60 includes one or more ports, shown as I/O ports 86. The I/O ports 86 are electrically coupled to the battery 30, according to an exemplary embodiment. The I/O ports 86 may include a port similar to and/or different from one of the I/O ports 48 of the user interface 40 (e.g., a specialty connector, a high voltage DC output, a fast charging input, etc.). As shown in FIGS. 3 and 4, the cavity 60 defines a first slot, shown as left slot 70, and a second slot, shown as right slot 72. As shown in FIG. 3, the left slot 70 is configured to selectively (e.g., removably, detachably, interchangeably, etc.) receive a first module, shown as first carriage 100, and the right slot 72 is configured to selectively receive a second module, shown as second carriage 120. According to an exemplary embodiment, the first carriage 100 and/or the second carriage 120 are interchangeable (e.g., with different types of modules, with each other, are modular adapters, etc.). In other embodiments, the first carriage 100 and/or the second carriage 120 are fixed or integrally formed within the cavity 60.

In some embodiments, the first carriage 100 and/or the second carriage 120 are selectively replaceable with a different type of module. The different types of modules may include a chaining carriage, an interface and communication carriage, a generator carriage, a high capacity output carriage, a fast charging or high capacity input carriage, and/or a linking carriage, among other alternatives. The various carriages may be configured to electrically couple the energy storage and power supply device 10 and/or the battery 30 using the I/O ports 86 to a power source (e.g., a power supply, a combustion generator, a solar panel system, a battery array, an external power source having a disparate energy storage chemistry, etc.) and/or a load device (e.g., a smartphone, a tablet, an E-reader, a computer, a laptop, a smartwatch, a portable and rechargeable battery pack, appliances, a refrigerator, lights, display monitors, televisions, a power grid of a residence, etc.). In other embodiments, the modules hold and/or support a load device facilitating use thereof with the energy storage and power supply device 10.

As shown in FIG. 4, a linking device or module, shown as link carriage 200, is disposed within the left slot 70 of the cavity 60 of the energy storage and power supply device 10. According to an exemplary embodiment, the link carriage 200 is selectively (e.g., removably, detachably, interchangeably etc.) received by the left slot 70. In other embodiments, the link carriage 200 is selectively received by the right slot 72. In an alternative embodiment, the link carriage 200 is integrally formed within the cavity 60 and/or to another portion of the energy storage and power supply device 10. According to the exemplary embodiment, the link carriage 200 is configured to connect to the battery 30 of the energy storage and power supply device 10 via the I/O ports 86 within the cavity 60.

Figure 5:
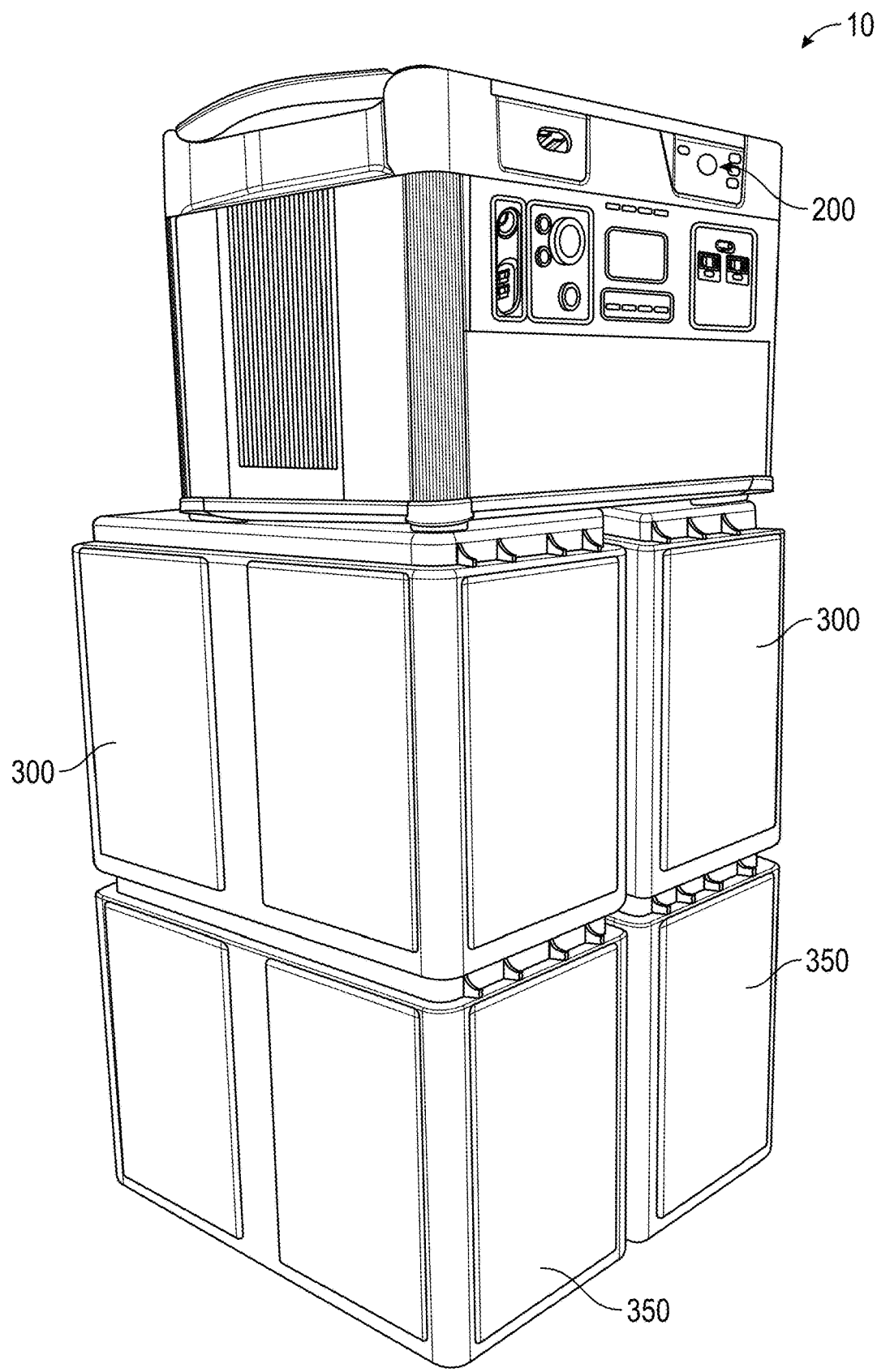
FIG. 5 is a perspective view of the energy storage and power supply device of FIG. 1 coupled to a plurality of external energy sources, according to an exemplary embodiment.

According to an exemplary embodiment, the link carriage 200 is configured to facilitate electrically coupling the energy storage and power supply device 10 to one or more external energy storage sources having a disparate type of energy storage (e.g., a battery having a disparate battery chemistry, etc.). As shown in FIG. 5, the link carriage 200 is configured to facilitate coupling the energy storage and power supply device 10 to one or more first external energy storage sources (e.g., reserve tanks, etc.), shown as first energy tanks 300, and/or one or more second external energy storage sources, shown as second energy tanks 350. The first energy tanks 300 and/or the second energy tanks 350 may be used to charge and/or increase the storage capacity of the battery 30 of the energy storage and power supply device 10. Such an arrangement may allow for the expandability of energy storage, as greater storage capacity can be achieved by adding external energy storage sources, whilst maintaining the portability of the energy storage and power supply device 10 (e.g., by decoupling the energy storage and power supply device 10 therefrom, etc.).

According to an exemplary embodiment, the first energy tanks 300 have a first energy storage chemistry and the second energy tanks 350 have a second energy storage chemistry, different than the first energy storage chemistry. At least one of the first energy storage chemistry and the second energy storage chemistry is different than the energy storage chemistry of the battery 30 of the energy storage and power supply device 10, according to an exemplary embodiment. By way of example, the battery 30 of the energy storage and power supply device 10 may have a lithium ion battery chemistry and the first energy tanks 300 and/or the second energy tanks 350 may be or include a lead-acid battery, a lithium phosphate battery, a fuel cell, and/or another type of energy storage device and/or chemistry. According to an exemplary embodiment, the link carriage 200 facilitates providing an energy system (e.g., the combination of the energy storage and power supply device 10, the first energy tanks 300, the second energy tanks 350, etc.) having a hybrid energy storage array that captures the advantageous characteristics of disparate battery chemistries in one assembly, mitigating the negative characteristics of each when standing alone (e.g., a hybridized energy storage system that combines the characteristics of multiple individual systems to capture the best features of each, etc.).

In some embodiments, the first energy tanks 300 and/or the second energy tanks 350 are dependent or passive devices that rely on the energy storage and power supply device 10 to receive power from a power source and to deliver power to a load. In other embodiments, the first energy tanks 300 and/or the second energy tanks 350 are capable of being independent or self-sufficient. By way of example, the first energy tanks 300 and/or the second energy tanks 350 may be implemented as part of a permanent installation that remains operational even when the energy storage and power supply device 10 is decoupled therefrom.

Figure 6:
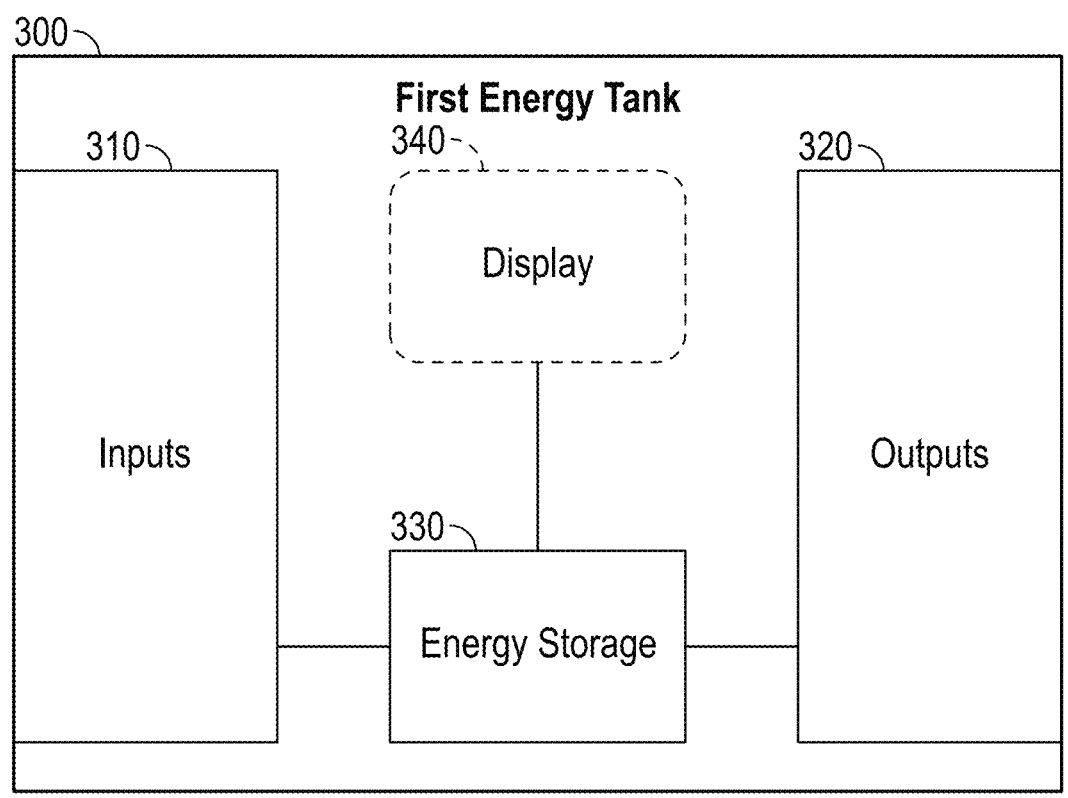
FIG. 6 is a schematic diagram of an external energy source of the plurality of external energy sources of FIG. 5, according to an exemplary embodiment.

According to the exemplary embodiment shown in FIG. 6, the first energy tank 300 (and similarly the second energy tank 350) includes one or more first interfaces, shown as inputs 310, one or more second interfaces, shown as outputs 320, an energy storage unit, shown as energy storage 330, and a display, shown as display 340. The display 340 may provide various information regarding the state and/or operation of the first energy tank 300 and/or the energy storage 330 (e.g., a battery level, a current input power, a current input voltage, a current input current, a current output power, a current output voltage, a current output current, an estimated time until a full charge of the energy storage 330 is reached, an estimated time until full and/or permitted depletion of the energy storage 330 is reached, a battery temperature, an insignia, a notification, a warning, etc.). In some embodiments, the first energy tank 300 does not include the display 340.

As shown in FIG. 6, the inputs 310 and the outputs 320 are electrically coupled to the energy storage 330. According to an exemplary embodiment, the inputs 310 are configured to receive electrical energy from a power source (e.g., a solar panel system, a combustion generator, a power supply, a 12V car adapter, a linked battery, a linked supply, the energy storage and power supply device 10, etc.) for storage by the energy storage 330. According to an exemplary embodiment, the outputs 320 are configured to provide the stored energy within the energy storage 330 to a load device (e.g., a smartphone, a tablet, an E-reader, a computer, a laptop, a smartwatch, a portable and rechargeable battery pack, appliances, a refrigerator, lights, display monitors, televisions, a linked energy tank, etc.) and/or the energy storage and power supply device 10 (e.g., through the link carriage 200, etc.). The inputs 310 and/or the outputs 320 of the first energy tank 300 may include AC inverter ports, DC inputs and/or outputs, USB ports, a 6 mm port, a 12V car port, a charging port (e.g., a solar panel charging port, a combustion generator charging port, a power supply charging port, a link carriage charging port, etc.), and/or a chaining port (e.g., to electrically couple two or more of the first energy tanks 300 in series, etc.).

According to an exemplary embodiment, the energy storage 330 is or includes a 12V lead-acid battery. In other embodiments, the energy storage 330 operates at a different voltage (e.g., 24V, 36V, 48V, etc.). In some embodiments, the energy storage 330 includes a plurality of batteries (e.g., two or more batteries connected in series, an array, etc.). In some embodiments, the energy storage 330 additionally or alternatively includes another type of battery (e.g., a lithium iron phosphate battery, a lithium ion battery, etc.) or another energy storage unit (e.g., one or more capacitors, a rechargeable fuel cell, etc.). It should be noted that the description herein regarding the first energy tanks 300 may similarly apply to the second energy tanks 350.

Figure 7:
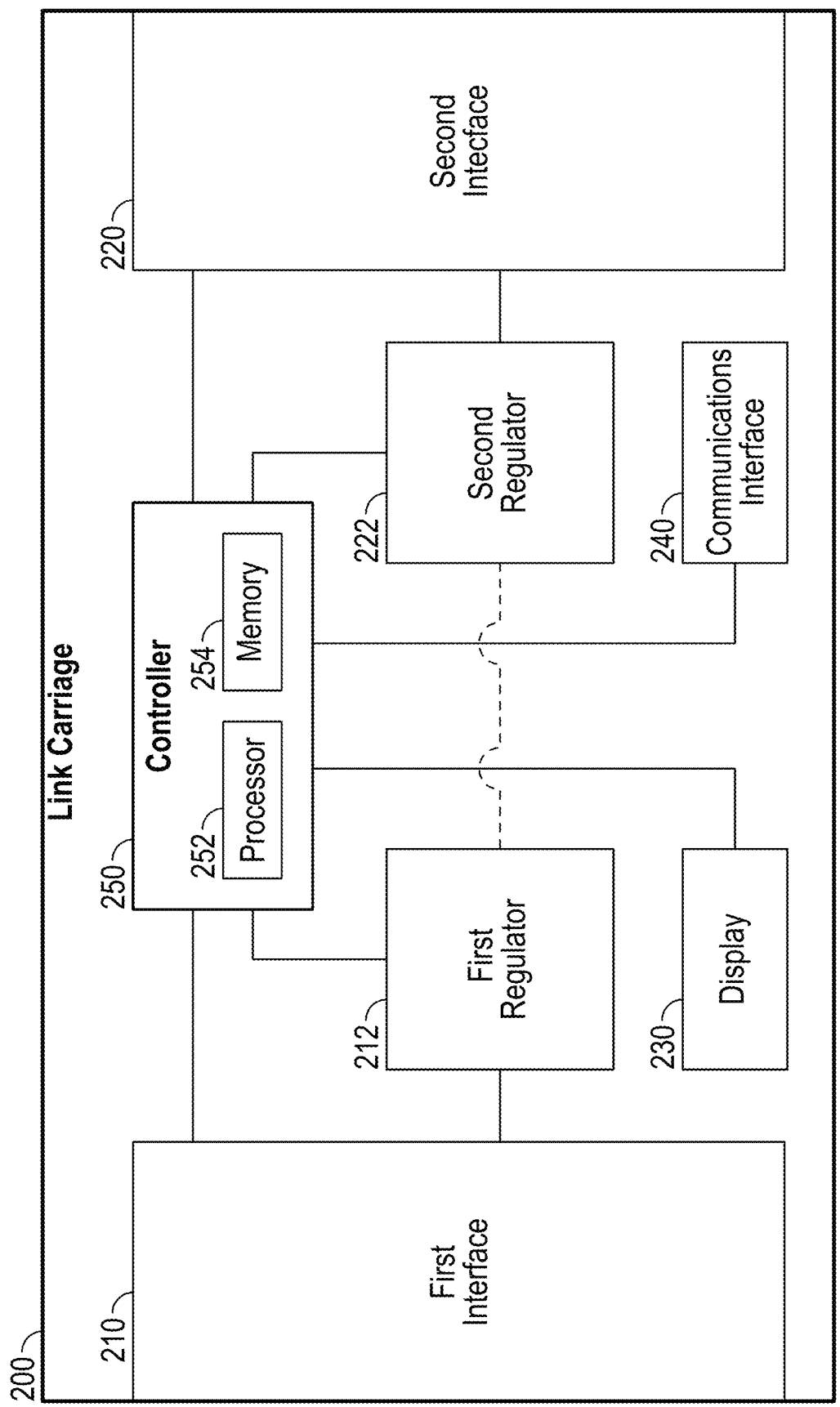
FIG. 7 is a schematic diagram of the linking module of FIG. 4, according to an exemplary embodiment.

As shown in FIGS. 4 and 7, the link carriage 200 includes a pair of interfaces, shown as first interface 210 and second interface 220, a pair of regulators, shown as first regulator 212 and second regulator 222, a display, shown as display 230, a communications interface, shown as communications interface 240, and a control system, shown as link controller 250. According to an exemplary embodiment, the first interface 210 is configured to electrically couple to the battery 30 of the energy storage and power supply device 10 (e.g., by way of the I/O ports 86, etc.). The second interface 220 is configured to electrically couple to one or more of the first energy tanks 300 and/or one or more of the second energy tanks 350. In some embodiments, the first interface 210 and/or the second interface 220 includes one or more sensors (e.g., a voltage sensor, a current sensor, etc.) configured to measure electrical characteristics (e.g., voltage, current, etc.) regarding power provided thereto or thereby (e.g., by the energy storage and power supply device 10, the first energy tank(s) 300, the second energy tank(s) 350, etc.). By way of example, the sensor may measure the nominal voltage of a connected battery using a specialized circuit (e.g., digital multi-meter, operational amplifier, voltmeter, etc.).

As shown in FIG. 7, the first regulator 212 is electrically coupled to the first interface 210, the second regulator 222 is electrically coupled to the second interface 220, and the first regulator 212 and the second regulator 222 are electrically coupled. In another embodiment, the first regulator 212 and the second regulator 222 are not coupled, but rather, (i) the first regulator 212 is connected between the first interface 210 and the second interface 220 independent of the second regulator 222 and (ii) the second regulator 222 is connected between the first interface 210 and the second interface 220 independent of the first regulator 212. According to an exemplary embodiment, the first regulator 212 is configured to facilitate regulating characteristics (e.g., current, voltage, etc.) of a first power flow received from and/or provided to the energy storage and power supply device 10. According to an exemplary embodiment, the second regulator 222 is configured to facilitate regulating characteristics (e.g., current, voltage, etc.) of a second power flow received from and/or provided to the first energy tanks 300 and/or the second energy tanks 350. In one embodiment, each of the first regulator 212 and the second regulator 222 is or includes DC-DC regulated circuits.

As shown in FIG. 4, the display 230 includes an LED indicator array. In other embodiments, the display 230 additionally or alternatively includes a display screen. The display 230 may provide various information regarding the state and/or operation of the energy storage and power supply device 10, the first energy tanks 300, and/or the second energy tanks 350 (e.g., a battery level or state of charge, a current input power, a current input voltage, a current input current, a current output power, a current output voltage, a current output current, an estimated time until a full charge is reached, an estimated time until full and/or permitted depletion is reached, a battery temperature, an insignia, a notification, a warning, etc.).

According to an exemplary embodiment, the communications interface 240 is configured to communicate with the energy storage and power supply device 10 to send data therebetween (e.g., by way of the I/O ports 86, a wireless transceiver, etc.). In some embodiments, the communications interface 240 is configured to additionally or alternatively communicate with the first energy tanks 300 and/or the second energy tanks 350. Such communications may include power regulation parameters such as power profiles, scheduling commands, minimum and maximum charge levels, active load management such as charge/discharge prioritization, and/or operational data. In some embodiments, the communications interface 240 is configured to additionally or alternatively communicate with a user device (e.g., a smartphone, tablet, router, computer, smartwatch, etc.) to facilitate providing such information to the user device (e.g., rather than directly on the unit, etc.).

According to an exemplary embodiment, the link controller 250 is configured to selectively engage, selectively disengage, control, and/or otherwise communicate with components of the link carriage 200, the energy storage and power supply device 10, the first energy tanks 300, and/or the second energy tanks 350. As shown in FIG. 7, the link controller 250 is coupled to the first interface 210, the first regulator 212, the second interface 220, the second regulator 222, the display 230, and the communications interface 240. In other embodiments, the link controller 250 is coupled to more or fewer components. By way of example, the link controller 250 may send and receive signals with the first interface 210, the first regulator 212, the second interface 220, the second regulator 222, the display 230, and/or the communications interface 240. The link controller 250 may be configured selectively control the first regulator 212 and/or the second regulator 222 to "force" the energy storage and power supply device 10, the first energy tanks 300, and/or the second energy tanks 350 to be compatible, despite the disparate energy storage chemistries thereof (e.g., by manipulating the power profiles thereof, etc.).

As shown in FIG. 7, the link controller 250 includes a processor 252 and a memory 254 (e.g., RAM, ROM, Flash Memory, hard disk storage, etc.). The processor 252 may be implemented as a general-purpose processor, an application specific integrated circuit ("ASIC"), one or more field programmable gate arrays ("FPGAs"), a digital signal processor ("DSP"), a group of processing components, or other suitable electronic processing components. The memory 254 may include multiple memory devices. The memory 254 may store data and/or computer code for facilitating the various processes described herein. Thus, the memory 254 may be communicably connected to the processor 252 and provide computer code or instructions to the processor 252 for executing the processes described in regard to the link controller 250 herein. Moreover, the memory 254 may be or include tangible, non-transient volatile memory or non-volatile memory. Accordingly, the memory 254 may include database components, object code components, script components, or any other type of information structure for supporting the various activities and information structures described herein.

According to an exemplary embodiment, the link controller 250 is configured to control the flow of power into and/or out of the energy storage and power supply device 10, the first energy tanks 300, and/or the second energy tanks 350 through the link carriage 200. In one embodiment, the link controller 250 is configured to prioritize charge and discharge to/from the energy storage and power supply device 10, the first energy tanks 300, and/or the second energy tanks 350 such that the energy storage and power supply device 10 is charged first and discharged first. In another embodiment, the link controller 250 is configured to prioritize charge and discharge to/from the energy storage and power supply device 10, the first energy tanks 300, and/or the second energy tanks 350 such that the first energy tanks 300 and/or the second energy tanks 350 are charged first and discharged first. In still another embodiment, the link controller 250 is configured to prioritize charge and discharge to/from the energy storage and power supply device 10, the first energy tanks 300, and/or the second energy tanks 350 such that (i) the energy storage and power supply device 10 is charged first and (ii) the first energy tanks 300 and/or the second energy tanks 350 are discharged first. In yet another embodiment, the link controller 250 is configured to prioritize charge and discharge to/from the energy storage and power supply device 10, the first energy tanks 300, and/or the second energy tanks 350 such that (i) the first energy tanks 300 and/or the second energy tanks 350 are charged first and (ii) the energy storage and power supply device 10 is discharged first. In still yet another embodiment, the link controller 250 is configured to prioritize charge and discharge to/from the energy storage and power supply device 10, the first energy tanks 300, and/or the second energy tanks 350 such that the energy storage and power supply device 10, the first energy tanks 300, and/or the second energy tanks 350 are simultaneously charged and discharged. In some embodiments, the battery 30 of the energy storage and power supply device 10 is altogether bypassed in charge and/or discharge (e.g., the energy storage and power supply device 10 acts as a conduit for power transfer, etc.). In some embodiments, when the input power to the energy storage and power supply device 10 exceeds the output power demand, the link controller 250 is configured to charge the battery 30 of the energy storage and power supply device 10 and the first energy tanks 300, and/or the second energy tanks 350 with the excess power (e.g., with priority given to the battery 30, etc.).

According to an exemplary embodiment, the link controller 250 is configured to control the first regulator 212 and/or the second regulator 222 to control the power profile (e.g., voltage, current, etc.) of power flowing in both directions through the link carriage 200: (i) from the energy storage and power supply device 10 to the energy tanks to charge the energy tanks (e.g., up to 10 amps, etc.) and (ii) from the energy tanks to the energy storage and power supply device 10 to charge the battery 30 and/or supply power to a load (e.g., up to 100 amps, etc.). Various factors may come into consideration when controlling the first regulator 212 and/or the second regulator 222 including, but not limited to, state of charge, battery temperature, ambient temperature, type of energy storage chemistry, current power demand by the load, permissible charging rates, and/or permissible discharging rates.

According to an exemplary embodiment, the link controller 250 is configured to detect the type of energy storage chemistry (e.g., a lead-acid battery chemistry, a lithium ion battery chemistry, a lithium iron phosphate battery chemistry, a fuel cell chemistry, etc.) and/or the voltage of (i) the battery 30 of the energy storage and power supply device 10 coupled to the first interface 210 of the link carriage 200 and/or (ii) the first energy tanks 300 and/or the second energy tanks 350 coupled to the second interface 220 of the link carriage 200. By way of example, the link controller 250 may be configured to detect the type of energy storage chemistry by matching the electrical characteristics of power received by the first interface 210 and/or the second interface 220 to a list of known characteristics (e.g., nominal battery operating voltage, stored in the memory 254, etc.). For example, a user may connect a 12V lead-acid battery as the external energy storage source to the link carriage 200 through the second interface 220. The link controller 250 may be configured to detect that the 12V lead-acid has been coupled to the link carriage 200 and determine the nominal voltage of the lead-acid battery (e.g., based on sensor readings, etc.). The link controller 250 may then be configured to match the nominal voltage to that of a lead-acid battery (e.g., using a look-up table, etc.) to identify the type of the energy storage chemistry. According to an exemplary embodiment, the link controller 250 is configured to implement an appropriate power profile based on the detected type of energy storage chemistry (e.g., relative to that battery 30 of the energy storage and power supply device 10, etc.).

In some embodiments, the link controller 250 is configured to actively manage the power supplied by the energy storage and power supply device 10 and/or the one or more external energy storage sources to a load in order to optimize for battery efficiency and life. By way of example, a 12V load could be powered directly from the one or more external energy storage sources with no need for regulation. Alternatively, a high AC load could be powered from the energy storage and power supply device 10 configured with a 48V lithium battery, which is more efficient because of the higher voltage thereof and also its capability to handle high C-rating discharges with a low Peukert's constant.

In some embodiments, the link controller 250 is configured to schedule usage of the energy storage and power supply device 10 and the one or more external energy storage sources to maximize cost savings on the grid (e.g., charge when electricity costs are low, discharge when electricity costs are high, etc.). In some embodiments, the link controller 250 is configured to automatically detect the chemistry of the one or more connected external energy storage sources and apply a power profile that intelligently uses chemistries that can handle high cycle counts. In other embodiments, the link controller 250 is configured to set maximum and minimum charge levels of the external energy storage sources based on chemistry to maximize cycle life. In other embodiments, the link controller 250 is configured to implement other intelligent algorithms.

Figure 8:
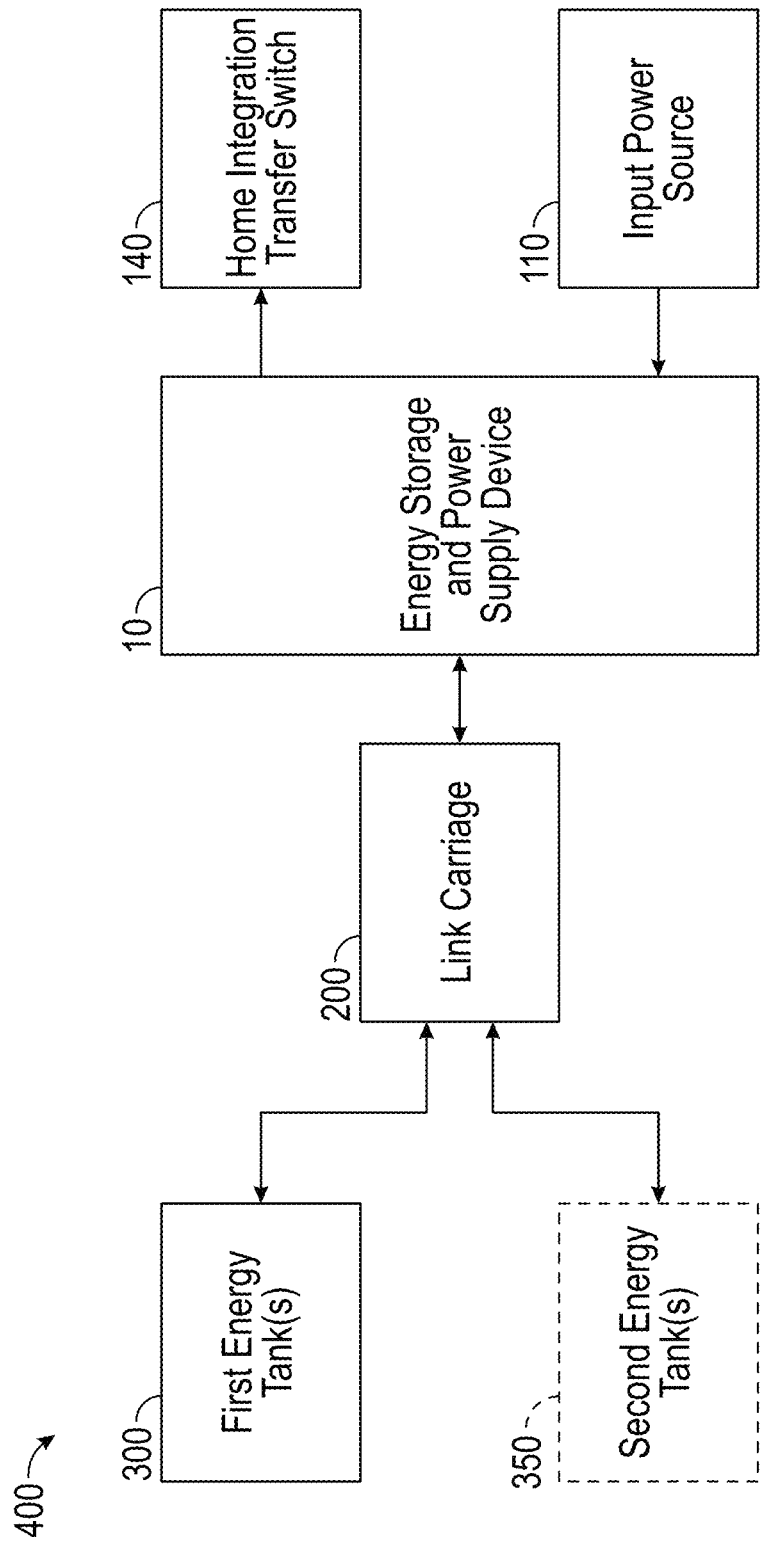
FIG. 8 is a schematic diagram of an energy system including the energy storage and power supply device, the linking module, and the external energy source, according to an exemplary embodiment.

According to the exemplary embodiment shown in FIG. 8, a first energy system, shown as energy system 400, includes the link carriage 200 electrically coupling the energy storage and power supply device 10 to one or more of the first energy tanks 300 and, optionally, one or more of the second energy tanks 350. In some embodiments, the link carriage 200 electrically couples a single first energy tank 300 to the energy storage and power supply device 10. In some embodiments, the link carriage 200 electrically couples a plurality of the first energy tanks 300 to the energy storage and power supply device 10 (e.g., a chain of first energy tanks 300, etc.). In some embodiments, the link carriage 200 electrically couples a single second energy tank 350 to the energy storage and power supply device 10. In some embodiments, the link carriage 200 electrically couples a plurality of the second energy tanks 350 to the energy storage and power supply device 10.

As shown in FIG. 8, an input power source, shown as input power source 110, is configured to couple to the energy storage and power supply device 10 (e.g., through the I/O ports 48, etc.). The input power source 110 is configured to provide power to the energy storage and power supply device 10 to at least one of charge (i) the battery 30 of the energy storage and power supply device 10, (ii) charge the energy storage 330 of the first energy tanks 300, and (iii) charge the energy storage of the second energy tanks 350, according to an exemplary embodiment. The input power source 110 may be or include a solar panel system, a combustion generator, a mains power connection, a vehicle alternator, and/or another suitable power source. As shown in FIG. 8, the energy storage and power supply device 10 is coupled to a load through a load interface, shown as home integration transfer switch 140. According to an exemplary embodiment, the home integration transfer switch 140 couples the energy system 400 to the power grid of a home, residence, or other building to operate as a power backup system. In other embodiments, the energy system 400 is implemented in a non-building application. For example, the energy system 400 may be used for an outdoor event that has an electrical demand greater than what the energy storage and power supply device 10 may be capable of providing independently.

Figure 9:
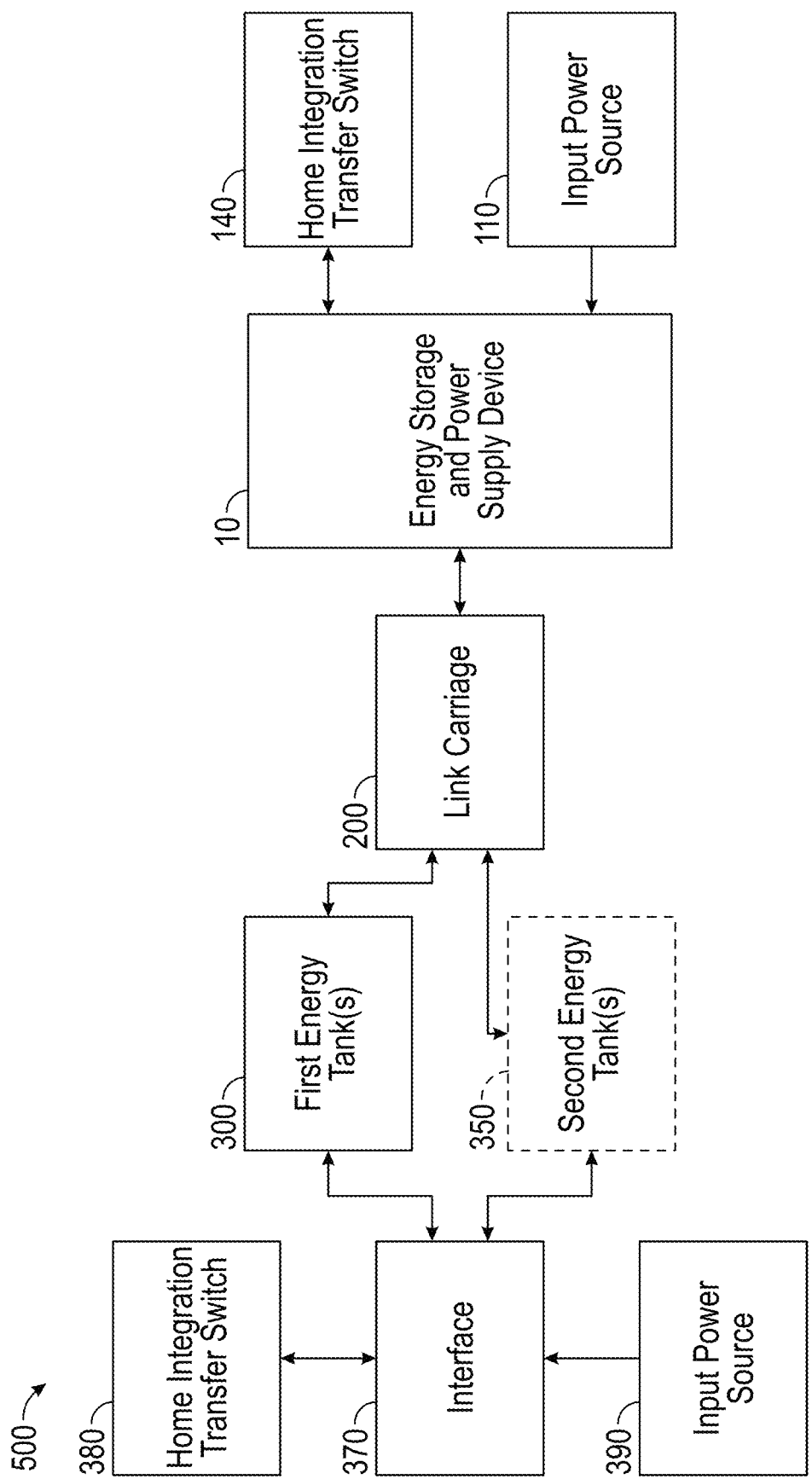
FIG. 9 is a schematic diagram of an energy system including the energy storage and power supply device, the linking module, and the external energy source, according to another exemplary embodiment.

According to the exemplary embodiment shown in FIG. 9, a second energy system, shown as energy system 500, includes all of the components of the energy system 400, but further includes an interface, shown as interface 370, that allows one or more energy tanks (e.g., one or more of the first energy tanks 300, one or more of the second energy tanks 350, etc.) to connect to (i) a second load interface, shown as home integration transfer switch 380, and (ii) a second input power source, shown as input power source 390. The interface 370 may be integrated into each respective energy tank or an external unit. The input power source 390 may be or include a solar panel system, a combustion generator, a mains power connection, and/or another suitable power source. According to an exemplary embodiment, the interface 370 enables the first energy tanks 300 and/or the second energy tanks 350 to operate as stand-alone units, independent of the energy storage and power supply device 10. The first energy tanks 300 and/or the second energy tanks 350 may therefore be able to receive and supply power to accommodate a load demand if and when the energy storage and power supply device 10 is decoupled from the energy system 500.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the energy storage and power supply device 10, the link carriage 200, the first energy tank(s) 300, the second energy tank(s) 350, the energy system 400, the energy system 500, and the components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. An energy system comprising:
an energy storage device including:
a housing; and
a battery disposed within the housing, the battery having a first chemistry; and
a link device configured to:
facilitate electrically coupling the energy storage device to an external battery;
receive input power from the external battery;
detect a chemistry type of the external battery, the detected chemistry type being different than the first chemistry; and
adjust a power profile of the input power received from the external battery based on the detected chemistry type of the external battery so that the input power from the external battery is compatible with the energy storage device;
wherein the energy storage device is configured to:
receive the input power from the external battery having the detected chemistry type through the link device; and
provide output power to a load using the input power received from the external battery having the detected chemistry type.

2. The energy system of claim 1, wherein the power profile is a first power profile and the input power is a first input power, wherein the link device is configured to regulate a second power profile of a second input power received from the energy storage device such that the energy storage device can charge the external battery.

3. The energy system of claim 1, wherein the energy storage device is configured to function as a conduit for power transfer from the external battery to the load such that the input power received by the energy storage device from the external battery through the link device is not stored by the battery.

4. The energy system of claim 1, wherein the energy storage device is configured to store the input power within the battery to charge the battery and then provide the output power to the load.

5. The energy system of claim 1, wherein the link device is further configured to:
select one of the energy storage device and the external battery to provide the output power to the load based on a power profile of the output power for the load, a power profile of the battery of the energy storage device, and a power profile of the external battery; and
direct the selected one of the energy storage device and the external battery to source the output power provided to the load via the energy storage device.

6. The energy system of claim 1, wherein the link device is detachable from the energy storage device.

7. The energy system of claim 6, wherein the housing defines a compartment, and wherein the link device is selectively insertable into and removable from the compartment.

8. The energy system of claim 1, wherein the link device is integrated into the housing.

9. The energy system of claim 1, wherein the energy storage device is a first energy storage device and the housing is a first housing, further comprising a second energy storage device including a second housing, wherein the external battery is disposed within the second housing.

10. The energy system of claim 9, wherein the link device is integrated into the second housing.

11. The energy system of claim 1, wherein the link device is configured to prioritize charging and discharging of the battery and the external battery such that (i) the battery is charged first and discharged first, (ii) the external battery is charged first and discharged first, (iii) the battery is charged first and the external battery is discharged first, (iv) the external battery is charged first and the battery is discharged first, or (v) the battery and the external battery are simultaneously charged and discharged.

12. An energy system comprising:
   a housing;
   a battery disposed within the housing, the battery having a first chemistry; and
   a link device configured to:
      facilitate electrically coupling the battery to an external source;
      receive input power from the external source;
      detect a chemistry type of the external source, the detected chemistry type being different than the first chemistry; and
      adjust the input power received from the external source based on the detected chemistry type of the external source so that the input power from the external source is compatible with the battery;
   wherein the battery is configured to:
      receive the input power from the external source having the detected chemistry type through the link device;
      store the input power as stored energy; and
      after storing the input power, provide an output to a load using the stored energy.

13. The energy system of claim 12, wherein the link device is separate from the housing.

14. The energy system of claim 12, wherein the housing defines a compartment, and wherein the link device is selectively insertable into and removable from the compartment.

15. The energy system of claim 12, wherein the link device is integrated into the housing.

16. The energy system of claim 12, wherein the input power is a first input power, wherein the link device is configured to regulate a second input power received from the battery such that the battery can charge the external source.

17. The energy system of claim 5, wherein the power profile of the output power is a voltage level of the output power for the load, the power profile of the battery is a voltage level of the battery, and the power profile of the external battery is a voltage level of the external battery.

18. The energy system of claim 12, wherein the housing is a first housing and the battery is a first battery, further comprising the external source, wherein the external source includes a second housing and a second battery disposed within the second housing and having the detected chemistry type.

19. The energy system of claim 18, wherein the link device is integrated into the second housing.

20. An energy system comprising:
   an energy storage device including:
      a housing; and
      a battery disposed within the housing, the battery having a first chemistry; and
   a link device having a first interface and a second interface, the first interface configured to selectively couple to the energy storage device, the second interface configured to selectively couple to an external battery, the link device configured to:
      detect a chemistry type of the external battery, the detected chemistry type being different than the first chemistry;
      adjust a power profile of first power received from the external battery based on the detected chemistry type of the external battery so that the first power from the external battery is compatible with the energy storage device;
      provide the first power to the energy storage device; and
      receive second power from the energy storage device and provide the second power to the external battery;
   wherein the energy storage device is configured to:
   receive the first power from the external battery through the link device;
   provide the second power to the link device to charge the external battery; and
   at least one of (i) provide third power to a load using the first power directly or (ii) store the first power in the battery as stored energy and provide the third power to the load using the stored energy.

* * * * *